United States Patent [19]
Reuter

[11] Patent Number: 5,754,863
[45] Date of Patent: May 19, 1998

[54] SYSTEM FOR DOWNLOADING PROGRAM CODE TO A MICROPROCESSOR OPERATIVE AS A SLAVE TO A MASTER MICROPROCESSOR

[75] Inventor: Gregory R. Reuter, Rochester, N.Y.

[73] Assignee: Redcom Laboratories, Inc., Victor, N.Y.

[21] Appl. No.: 376,957

[22] Filed: Jan. 20, 1995

[51] Int. Cl.$^6$ .................................................. G06F 9/445
[52] U.S. Cl. ............................................................ 395/712
[58] Field of Search ..................................... 395/652, 712

[56] References Cited

U.S. PATENT DOCUMENTS

| | | | |
|---|---|---|---|
| 4,228,536 | 10/1980 | Gueldenpfennig | 370/66 |
| 4,805,172 | 2/1989 | Barbe et al. | 370/68.1 |
| 4,862,452 | 8/1989 | Milton et al. | 370/62 |
| 4,991,169 | 2/1991 | Davis et al. | 370/77 |
| 4,992,736 | 2/1991 | Stormont et al. | 324/309 |
| 5,068,780 | 11/1991 | Bruckert et al. | 395/652 |
| 5,136,631 | 8/1992 | Einhorn et al. | 379/67 |
| 5,280,627 | 1/1994 | Flaherty et al. | 395/652 |
| 5,291,479 | 3/1994 | Vaziri et al. | 370/58.2 |
| 5,319,754 | 6/1994 | Meinecke et al. | 395/325 |
| 5,323,473 | 6/1994 | Lau | 382/48 |
| 5,408,624 | 4/1995 | Raasch et al. | 395/712 |
| 5,452,454 | 9/1995 | Basu | 395/652 |
| 5,471,674 | 11/1995 | Stewart et al. | 395/652 |

Primary Examiner—Kevin A. Kriess
Assistant Examiner—John Q. Chavis
Attorney, Agent, or Firm—K. J. Lukacher; M. Lukacher

[57] ABSTRACT

A master microprocessor downloads program codes to a slave microprocessor which does not require a read-only memory ROM containing any instruction codes. While downloading, the slave microprocessor reads the program instructions to execute from a register, which is written to by the master microprocessor. The execution of these instructions causes the slave microprocessor to write program instructions to its RAM which will be executed later, in normal operation. The slave microprocessor has a handshaked bus which causes it to terminate a read from the register only after the master microprocessor has written to it. Logic, preferably a programmable array logic (PAL) device, decodes addresses and generates the "READY" handshake bus signal for the slave microprocessor. The cost of the slave microprocessor is reduced since a bootloader ROM which may be embedded internal or external to the slave microprocessor integrated circuit chip is not required. Also additional circuitry for loading program code as is required in direct memory access (DMA) is not required. Only an existing register, which is also used by the master microprocessor to send messages to the slave microprocessor in normal operation, operative in handshaking bus transactions is required thereby reducing the cost of the slave microprocessor and its associated devices.

13 Claims, 4 Drawing Sheets

SYSTEM FOR DOWNLOADING PROGRAM CODE TO A MICROPROCESSOR OPERATIVE AS A SLAVE TO A MASTER MICROPROCESSOR

BACKGROUND OF THE INVENTION

The present invention relates to systems containing processors which are operative as slaves to a master processor and particularly to systems for downloading program code to (booting) the slave processor without a preprogrammed read-only memory containing booting instructions in the slave processor thereby providing for ROM-less downloading of program code automatically when the slave processor is installed in the system initially or when the program code is to be administered or changed.

The present invention is especially suitable for use in TDM (time division multiplex) telephone switching systems having slave processors which are under the control of a master processor. Such a unit may be any intelligent (processor containing) board or card such as the digital signal processor (DSP) cards or modules which translate messages transmitted on the TDM highways of the telephony switching system into messages for performing switching functions as in the time slot interchange of the system. Other intelligent processors can be line cards, conference boards and other trunk or line serving circuits. The DSP may for example acquire messages representing dialed digits and pass such messages or messages corresponding to the dialed digits to the CPU which then controls the time slot interchange which performs switching operations. Examples of such TDM telephony switching systems are described in U.S. Pat. No. 4,288,536 issued to Klaus Gueldenpfennig and Charles J. Breidenstein on Oct. 14, 1980 and U.S. Pat. No. 4,805,172 issued to C. A. Barbe and B. G. Littlefield on Feb. 14, 1989.

The processors of such boards usually contain a ROM which is preprogrammed by the integrated circuit (chip) manufacturer with the booting code or even program code. The cost of preprogramming increases the cost of the processor. In the event the program code or the booting instructions are changed, a new processor chip must be purchased and used to replace the existing processor chip. Processor chips may be produced with such ROMs as a matter of manufacturing convenience. The cost of the chip depends upon whether the manufacturer of the chip is responsible for activating and loading the ROM. Such chips capable of having their ROMs preloaded are commercially available. An example of a DSP with a processor having such preloadable ROMs is the Texas Instruments TMS320 DSP chip which is described in product literature published by Texas Instruments (January 1993).

Systems where peripheral processors are booted in response to instructions from an associated ROM are described in the following U.S. Pat. Nos. 4,862,452 issued Aug. 29, 1989 to Milton, et al.; 5,323,473 issued Jun. 21, 1994 to Lau; and 5,291,479 issued Mar. 1, 1994 to Vaziri, et al.

In U.S. Pat. No. 4,991,169 issued Feb. 5, 1991 to Davis, et al., complex hardware is needed to multiplex addresses between the host processor and the peripheral processor which is disadvantageous in view of the need for multiplexing circuitry and the reduction in data transfer speed to accommodate multiplexing. U.S. Pat. No. 5,136,631 issued Aug. 4, 1992 to Einhorn, et al. appears to use a similar multiplexing scheme.

In U.S. Pat. No. 4,992,736 issued Feb. 12, 1991 to Stormont, et al. additional peripheral registers dedicated to downloading operations are needed.

The multiplexing techniques such as described in the Davis, et al. patent are a special case of a direct memory access (DMA) approach enabling the master processor to write directly to the memory (RAM) of the slave processor, which requires circuitry in addition to that already available in the slave processor for other purposes, such additional circuitry for example being address and data bus drivers, buffer registers and memory strobe generation signals which increase the cost and complexity of the slave processor.

SUMMARY OF THE INVENTION

It is a feature of the present invention to avoid the need for instruction or booting code in ROM to effect downloading of program code (the so called booting or boot-strapping operation) of the slave processor when it is initially installed in the system or when the program code therein needs to be changed, thereby providing for ROM-less downloading of instruction and program codes.

It is an ancillary feature of the present invention to provide for ROM-less downloading utilizing devices necessary to run the slave processor and particularly the input/output (I/O) registers and the associated register flag which enables instruction and program codes to be downloaded from the master to the slave processor.

It is still another ancillary feature of the invention that during downloading, the input register used for communicating from the master to the slave processor is mapped by an address decoder to the slave processor's program space including the reset vector through which the master processor writes instruction codes to the slave processor which executes them, causing the slave processor to write program codes to the slave processor's SRAM.

By virtue of the use of one or more of these features ROM-less downloading of a slave processor from a master processor without the need for hardware additional to the peripheral slave processor, the decoder and the I/O registers normally associated with the slave processor for addressing and communication (bus transactions) with the master are obtained, thereby reducing the cost of the slave processor system by eliminating the need for a ROM device.

Briefly described, the system for ROM-less booting of program code for a slave processor in accordance with the invention which utilizes the I/O registers and the decoder of the slave processor unit, uses the decoder as means for addressing one of the registers to which the master processor writes in normal data transfer operations causing that register to be addressed during downloading, as signaled by the master processor. Then the program and/or other instruction code in that register is transferred to a RAM in program space (at addresses) dedicated to the program and instruction codes from the command register. One instruction or program code word at a time is transferred from the master to the register in the I/O registers. The slave processor reads this register and transfers data to SRAM program space. After booting or downloading is completed and the system is in its normal running mode, the command register is written to by the master processor and read from by slave processor for inter-process messages. Thus no additional hardware is required to obtain downloading without the need for ROM containing instruction and program code.

BRIEF DESCRIPTION OF THE DRAWINGS

The foregoing and other objects, features and advantages of the invention as well as a presently preferred embodiment thereof will become more apparent from a reading of the following description in connection with the accompanying drawings in which.

DESCRIPTION

Figure 1:
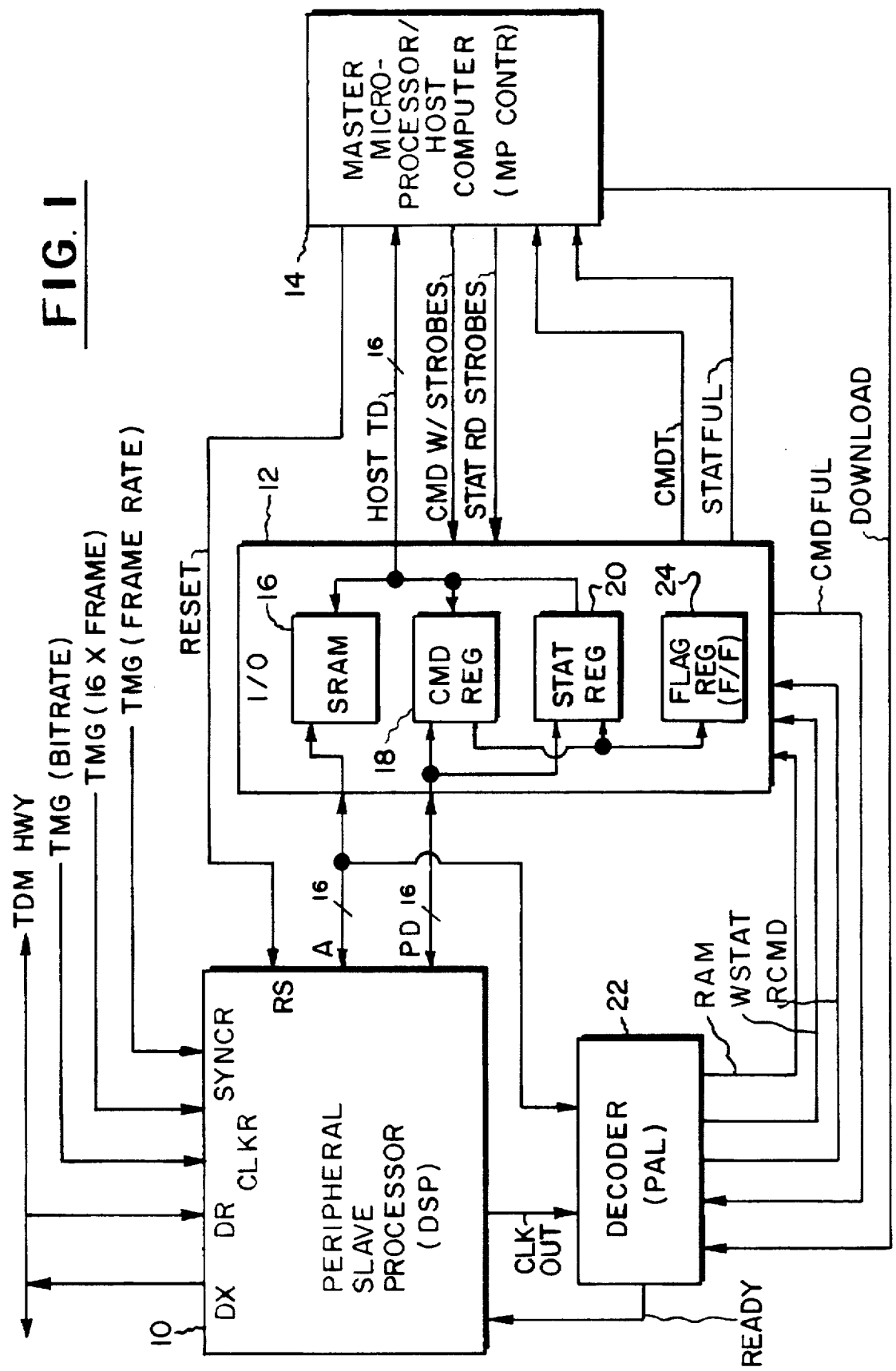
FIG. 1 is a block diagram of a telephony system having a slave processor, particularly a DSP which is connected via I/O registers to a master processor.

Referring to FIG. 1 there is shown a slave processor 10 which may be mounted on a board, either alone or as a module connected with other equipment on that board. The board may be among other boards which constitute a shelf of a time division multiplex telephone switching system such as described in the above-referenced Gueldenpfennig et al or Barbe et al patents. The TDM telephone signals and signaling messages may travel along a TDM highway in bytes of digital data, as described in these patents. The highway is connected to a peripheral slave processor 10. The signaling messages may use another line which is not shown and if used is also connected to the slave processor 10. The slave processor is connected to the highway via ports on the processor integrated circuit for receiving and transmitting the bytes in the time slots allotted to the processor 10. These ports are indicated as data receive (DR) and the data transmitting (DX) ports. In the event that the processor is a digital signal processor (DSP), such for example, as the above-referenced Texas Instruments TMS 320, during normal running operation of the DSP, the messages received may, for example, correspond to dialed digits which are collected and then forwarded by the processor over data lines (PD) and host TD via I/O registers 12 to a master microprocessor 14, which utilizes the digits to establish connections in the time slot interchange of the telephone switching system.

The timing generator associated with the time slot interchange of the telephone switching system sends timing signals to the slave processor 10 at the bit rate of the TDM data on the highway (TMG-bit rate), and also at the frame rate (TMG-frame rate) which provides the reference at the beginning of each frame of TDM data. Another timing signal (TMG-16 times frame) occurs at 16 times the frame rate, when 16 bit words are used and indicates the alignment (in time) of a pair of bytes which are processed simultaneously in the processor 10.

The master processor provides a reset input when the slave processor system is first installed in the switching system, when card carrying the system is first inserted into the telephone switching system or whenever power is restored, or whenever a new program or administration of an existing program is necessary. The master processor determines, based on its programming, when to assert a reset.

The illustrative slave processor system includes a static RAM (SRAM) 16 having locations (program space) for instruction and program code which is down loaded in this system without the need for a program ROM or bootstrap ROM, as is ordinarily supplied with the DSP or other processor. It should be understood that even though such ROMS may be embedded in the microprocessor integrated circuit chip, they are not used in the herein described system because the invention enables ROMless down loading of instruction and program code. The cost of the integrated circuit processor is much less when effective (operational or functional) ROM is not provided as part of the chip. The manufacturer finds it more expedient to make all chips alike even though operational ROM is not ordered, and accords a cost saving, which may be about 20% of the price of the chip, when functional ROM is not ordered. RAM 16 is illustrated in Block 12 (FIG. 1) which includes the I/O Registers.

Another register 18 in the I/O registers is the command register (CMD REG). This register receives command requests which are used by the processor 10 in carrying out its program. In accordance with this invention, the command register has a dual function. During normal running operation it handles command requests and may receive data from the host 14 which is forwarded over PD to the processor. It will be understood that in normal running (non-downloading) operation the responses to the commands and other operations in the slave processor result in data which is transferred to the host 14 via the master TD lines through the status register 20. During downloading, the command register 18 appears to the peripheral processor as though it were a ROM containing instruction and program code. The program and instruction code is transferred from the master to the CMD register 18 one word at a time (a word may contain two 8 bit bytes) in the herein illustrated slave processor system. These words are then fetched by the slave processor and transferred to the RAM 16 in program space identified by addresses on an address line going from the slave processor 10 to the SRAM 16. This address line may be a parallel address bus, which in this exemplary system carries 16 bits as does the data buses consisting of the data lines.

The address lines are decoded by a programmable logic array (PAL) 22. The decoder reads the addresses and decodes them to address the command register 18 reads or the status register 20 writes. When these registers are addressed, read/write enable lines (RCMD or WSTAT) are asserted. Reads or writes to the program or data space assigned to the SRAM 16 causes the decoder to assert the SRAM enable line (RAM).

An important feature of this invention is that during the download mode, certain addresses are decoded to address the command register 18 in the I/O registers 12. These are addresses within the program space a range of addresses, for example, sufficient addresses to address program space for the program and instruction codes. A location for a vector code is included in this range. The first location on start-up or after a reset which is addressed, and from which information is fetched from the command register 18, is referred to as the reset or restart vector location.

Also included in the I/O registers 12 are flag registers 24 which are connected to the command register 18 and the status register 20 and read the contents thereof indicating whether or not there is data available in these registers to be read by the processor 10. The flags are also read by the master microprocessor 14 over lines indicated as CMDT (command register empty), STATFUL (status register full or having data available to be read by the master 14), and CMDFUL (that the command register has data which is ready to be read by the slave processor).

The decoder PAL 22 is a commercial, programmable array logic device which reads the addresses when clocked (when CLK OUT is strobed) and decodes them. The decoder 22 also receives a download line from the master, which when asserted, remaps the addresses so that all addresses in the program space address the command register 18. It also responds to the command full flag and asserts a ready signal to the processor 10, only when new data is received from the master 14 and is contained in the command register so as to provide handshaking operation, thereby enabling the slave processor to be supplied with successive instruction and program words, one word at a time, exactly as such words would have been supplied by a ROM, if the system were ROM equipped. During normal running operation, handshaking operation is not utilized and data from the master is transferred asynchronously.

Figure 2A:
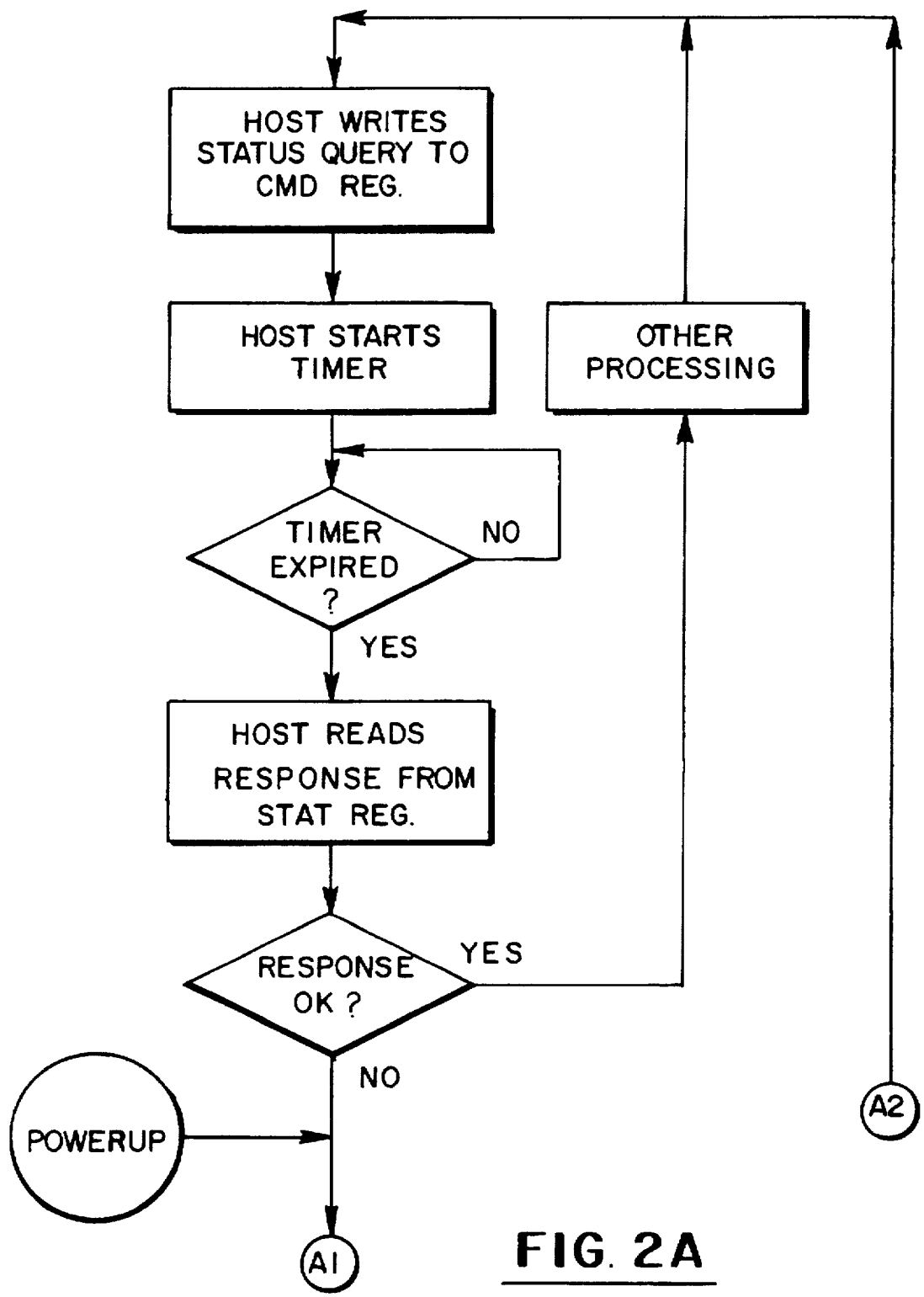
FIG. 2A, B and C taken together are a flowchart indicating the operation of the master processor and slave processor for downloading instruction and program code from the master to slave processor.

The operation of the slave processor to download program and instruction code will be better understood in connection with the following description and FIGS. 2A, B, and C which together as connected by the connectors A1—A1, A2—A2, B1—B1, and B2—B2 constitute a flowchart indicating the programming of the master 14 and the slave processor 10 of the system.

The master microprocessor 14 periodically requests the status of the DSP 10 by writing a status request code into the CMD register 18 which the DSP 10 periodically reads. The DSP then responds with a status code which it writes into the STAT register 20. The master 14 then reads the STAT register 18 to obtain the code. This is used for "sanity" (whether the DSP is operational—e.g., not present or requires programming) checks, as well as the normal command and status reports which are application specific (such as "send tone x", or "received digit y", etc.).

In this normal running (non-downloading) mode the CMD and STAT registers are treated as dual-port memory registers with no special bus handshaking. In other words, neither master microprocessor 14 nor DSP 10 requires a hardware handshake from the other processor in order to complete a read or write cycle to the CMD and STAT registers 18 and 20. Data read from these registers 16 and 18 remain therein until new data are written, no matter how many times the data are read. These processes are shown in FIG. 2A. Normal master processing (e.g., working other slaves, etc.) is denoted by "other processing".

Figure 2B:
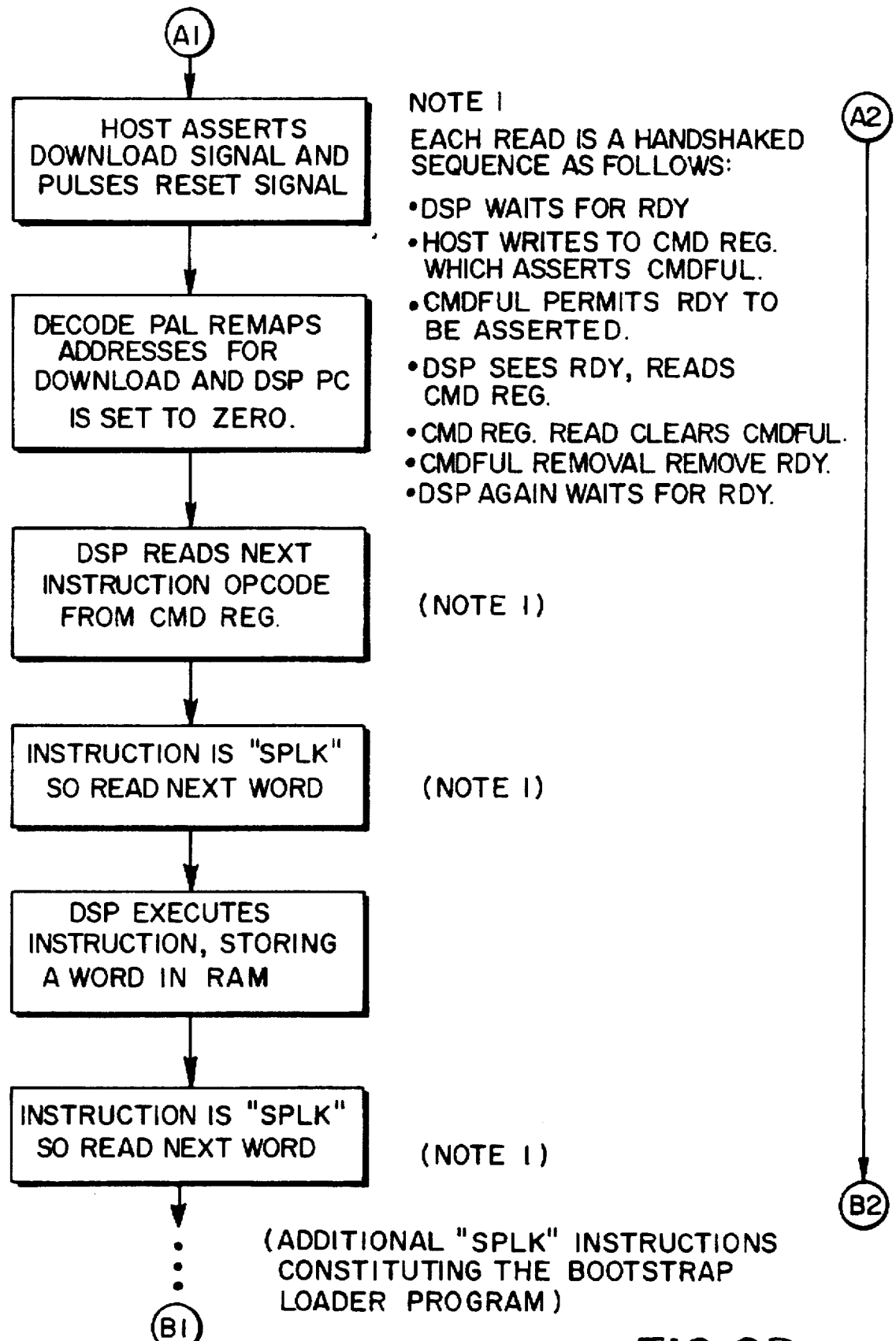
Figure 2C:
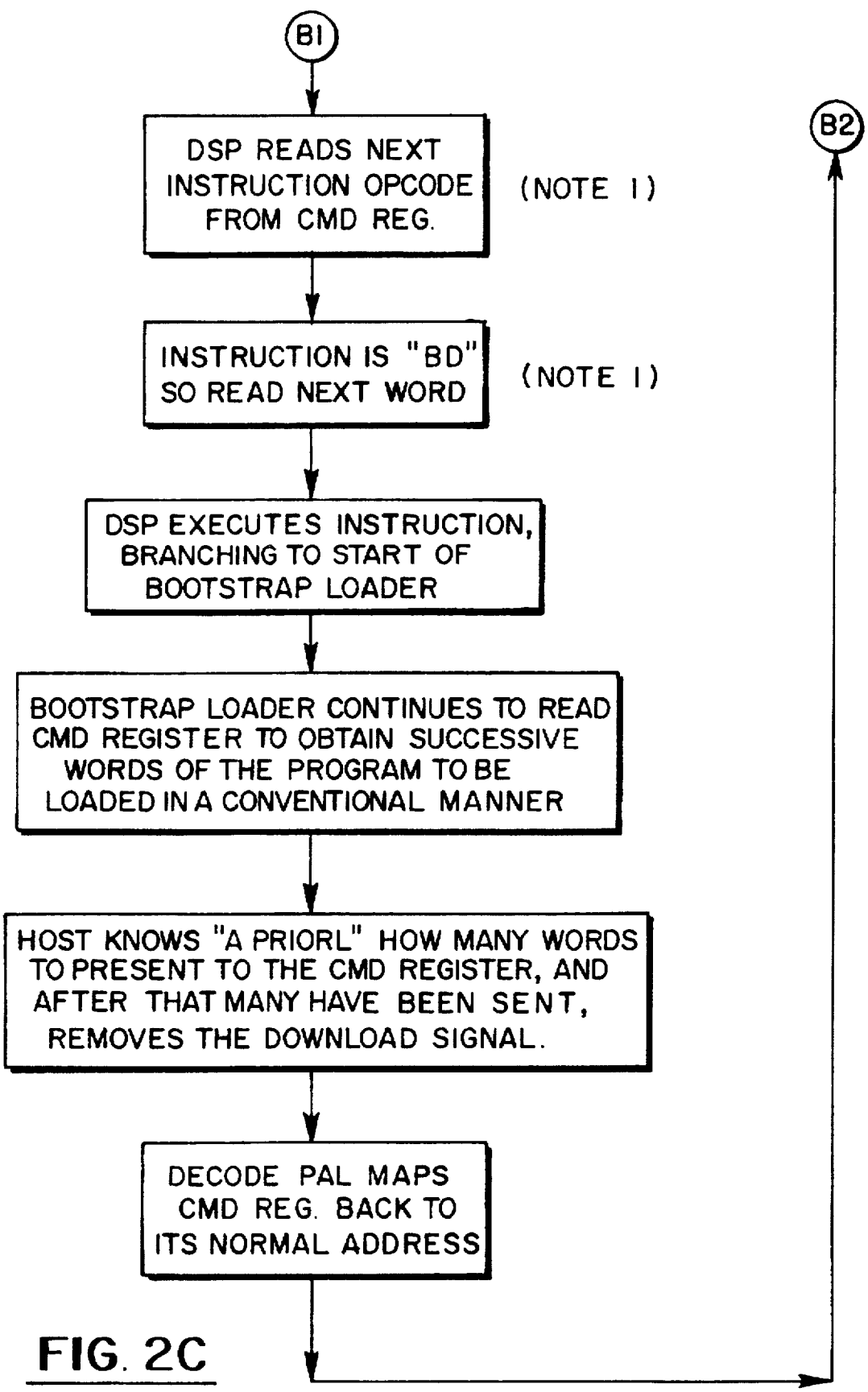

If the master 14 receives an incorrect status response or no response after a certain time period, the master determines that a reload and a re-initialization of the DSP software is required. This also occurs after initial powerup since the DSP's RAM 16 will not contain a valid program at that time. The master will initiate downloading of the DSP system by asserting the download signal and briefly asserting (pulsing) the DSP Reset line. The power-up condition and the assertion of Download and Reset signals is indicated in FIG. 2B.

The assertion of the download signal alters the bus control logic within PAL 22 for the program space addresses. In this example this is in the address range in hex notation ($ for hex) $0000–$7FFF, the CMD and STAT registers addresses and the DSP READY signal. All DSP reads to address range $0000–$7FFF are now decoded by the PAL decoder 22 as reads of the CMD register 18. Furthermore, the DSP READY signal will not be asserted until new data have been written to the CMD register 18 by the master microprocessor 14.

After the DSP reset signal has been pulsed, the DSP 10 will begin execution of a program at address $0000, the Reset address. Another processor may use a different address for the initial program, or may pick up an address (vector) for the initial program address. The principles of the present invention can be applied to any of these schemes as long as the addresses accessed by the processor (DSP in this case) are re-mapped to coincide with the CMD register address.

As the DSP reads successive words of the program being executed (which would normally be a bootstrap program in ROM), due to the address remapping, it is actually repeatedly reading the CMD register 18. In other words, the DSP may be addressing location 0, 1, 2, 3, 4, . . . but the address re-mapping caused by the assertion of the download signal causes all of these addresses to access the CMD register 18. The master 14 however, writes a series of data words into the CMD register which exactly mimics what the DSP would read if it were executing a program from ROM. Since the master is programmed to know how many words are to be loaded, the master can maintain the download signal asserted until all the loading is completed, and then remove the download signal, restoring the address mapping and register logic for the normal running mode of system operation.

While the download signal is asserted, the DSP and master microprocessor reads and writes are coordinated through the use of the flags on the CMDFUL and READY lines as follows:

a) DSP initiates read of the CMD register, but cannot complete the bus cycle since READY is not asserted.

b) master writes command into CMD register which asserts CMDFUL.

CMDFUL results in READY being asserted.

c) DSP senses READY asserted, completes read of CMD register.

This cycle repeats for each word read as long as the download signal is asserted, and is indicated as a Note 1 on FIG. 2B.

The first few instructions which are presented, one word at a time, to the DSP in this manner constitute "store immediate" instructions and consist of an opcode, the immediate data to be stored, and the address at which the data are to be stored. These are, in assembly language used by the Texas Instruments processor TMS320, splk, bd (a jump instruction and other conventional opcodes, setc, ldp—as used in the program shown in Table 1). The DSP executes these codes and writes a bootstrap program to RAM which controls transfer of instruction code between the master 14, the CMD register 18 and the RAM 16. A typical bootstrap program into RAM 16 is given below in Table 1. Table 1 uses representations and mnemonics for the TMS320 processor.

TABLE 1

| OP CODE | DATA | RAM ADR | COMMENTS |
|---|---|---|---|
| | | | Secondary Bootstrap Loader Program |
| splk | #0BEC4h, | 0100h | ;rpt #1k |
| splk | #end_label - 8000h | 0101h | ;oper (length) |
| splk | #0A700h, | 0102h | ;tblw #0 |
| splk | #07D80h, | 0103h | ;bd |
| splk | #08000h | 0104h | ;oper (prog start) |
| splk | #0B904h | 0105h | ;lacl #04h |
| splk | #08806h | 0106h | ;samm ifr |
| setc | cnf | | ;B0—>PS, codes written to 100h executed at FE00h |
| ldp | # 06000h/128 | | ;DP—>cmd reg |
| bd | 0FE00h | | |

Enough of these instructions are supplied and executed to permit storing a second level bootstrap program into RAM. 16 A jump to this RAM program is then supplied and executed upon occurrence of bd, whereupon the secondary bootstrap loader begins execution. This program then reads the CMD register to obtain the remaining words comprising the actual program to be loaded, and stores them in RAM 16 at successive addresses.

The use of the secondary bootstrap program speeds the loading process since only the actual program data need be passed through the CMD register, whereas for the initial loading an instruction opcode and destination address are passed for each word of program data.

From the foregoing description, it will be apparent that there has been provided an improved slave processor system. While the system has been described in connection with a telephone switching system, it may be used for other applications wherever ROMless downloading is desired. Also while the microprocessors operative as a slave are discussed in the specification and used in the claims these should be taken to include processors generally, and uses as peripherals to a host computer or the processor thereof. Variations and modifications in the herein described system within the scope of the invention, will undoubtedly suggest themselves to those skilled in the art. Accordingly, the foregoing description should be taken as illustrative and not in any limiting sense.

I claim:

1. A system for ROM-less booting of program code for a slave processor, including RAM, I/O registers and a decoder, from a master microprocessor which comprises means including the decoder operative when signalled by the master for booting by addressing one of the registers to which the master writes in normal data transfer operations causing that register to be addressed whenever the slave processor asserts an address in a program space range, means for transferring program code between the master and RAM via said one register to said RAM for storage in program space at said addresses.

2. The system according to claim 1 wherein said transferring means includes means for transferring one program code words one at a time from the master to said one register in the I/O registers and then from said one register to the RAM in said program space.

3. The system according to claim 1 wherein said transferring means includes means for first transferring instruction code words and then using said instruction code words to transfer program code words to said RAM via said one register.

4. The system according to claim 1, wherein said transferring means further comprises means for executing program code in said one register to write program code from said one register to said RAM.

5. A system for booting of program code for a microprocessor which operates as a slave to a master microprocessor and has at least one I/O register, through which program code and data is transferred between the slave processor and the master microprocessor, from the master microprocessor without the slave processor having a ROM containing booting instruction code, said system comprising a decoder connected to the master and the slave processor and the I/O register via a plurality of connections, said connections including address code carrying lines to the decoder from the slave processor, command lines from the decoder to the I/O register which enable writing to and reading of data from the I/O register, lines for carrying data between the slave processor, the I/O register and the master, a download line between the master and the decoder, which identifies when asserted and not asserted booting and running operating modes of the system respectively, and a ready line from the decoder to the slave processor which indicates to the processor whether data representing program code is available in the I/O register, said decoder being responsive in said booting mode to map address codes presented over said address lines thereto which are in a group of predetermined address codes to the address of the I/O resister while said master asserts commands on said command lines to enable the I/O register to receive program codes from said master in said I/O register, and said I/O register being addressed by said slave processor for each of said mapped address codes to enable transfer of said program codes from said I/O register to said slave processor when in said booting mode and to enable transfer of data between said slave processor and said master when in said running mode.

6. The system according to claim 5 wherein said slave processor comprises a RAM to which said address lines are connected and which stores said program code transferred from said I/O registers in locations in said RAM corresponding to different ones of said predetermined group of addresses.

7. The system according to claim 6, wherein said I/O registers include a command register which receives said program codes and data via said data lines from said master processor.

8. The system according to claim 6, wherein said predetermined addresses are addresses within a range of consecutive addresses.

9. The system according to claim 8, wherein the first of said consecutive addresses is the startup default address of said processor.

10. The system according to claim 5, wherein said system has means for transferring data and program codes between said master and said registers synchronously with production of said address codes by said processor.

11. The system according to claim 10, wherein said processor is part of a TDM telephony switching system having a TDM highway for digitive telephony channels operative at a certain data rate.

12. The system according to claim 11, wherein said data rate is responsive to timing signals received by said processor.

13. The system according to claim 5, wherein said decoder is a programmable array logic (PAL) device.

* * * * *